(12) United States Patent
Augier et al.

(10) Patent No.: US 8,337,787 B2
(45) Date of Patent: Dec. 25, 2012

(54) COMPACT DEVICE FOR MIXING FLUIDS IN A DOWNFLOW REACTOR

(75) Inventors: Frederic Augier, Saint Symphorien D Ozon (FR); Denis Darmancier, Vienne (FR); Christophe Boyer, Charly (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 154 days.

(21) Appl. No.: 12/950,041

(22) Filed: Nov. 19, 2010

(65) Prior Publication Data
US 2011/0123410 A1 May 26, 2011

(30) Foreign Application Priority Data
Nov. 20, 2009 (FR) ...................... 09 05595

(51) Int. Cl.
*B01J 8/04* (2006.01)
*B01J 10/00* (2006.01)
(52) U.S. Cl. ........ 422/647; 422/220; 422/224; 422/606; 422/645
(58) Field of Classification Search .................. 422/220, 422/224, 606, 645, 647
See application file for complete search history.

(56) References Cited

U.S. PATENT DOCUMENTS
3,433,600 A * 3/1969 Christensen et al. ......... 422/607
5,232,283 A * 8/1993 Goebel et al. ................. 366/336
5,567,396 A 10/1996 Perry et al.
2004/0134836 A1 7/2004 Muller
2004/0228779 A1 11/2004 McDougald et al.

FOREIGN PATENT DOCUMENTS
EP 1 477 222 A1 11/2004

OTHER PUBLICATIONS
Search Report of FR 0905595 (May 5, 2010).
* cited by examiner

*Primary Examiner* — Walter D Griffin
*Assistant Examiner* — Lessanework Seifu
(74) *Attorney, Agent, or Firm* — Millen, White, Zelano & Branigan, P.C.

(57) ABSTRACT

A compact device for mixing fluids in a downflow reactor comprising at least one substantially horizontal gathering device provided with a vertical gathering line intended to receive the fluids, at least one injection device arranged in the gathering line, an annular mixing chamber located downstream from the gathering means in the direction of circulation of the fluids, the mixing chamber comprising an inlet end directly connected to the gathering line and an outlet end for passage of the fluids, and a horizontal predistribution plate comprising at least one chimney, the plate being located downstream from the mixing chamber at a distance d2, in the direction of circulation of the fluids. The reactor is especially useful for exothermic reactions, e.g. hydrotreatment, hydrodesulfurization, hydrodenitrogenation, hydrocracking, hydrogenation and hydrodearomatization reactions.

13 Claims, 3 Drawing Sheets

COMPACT DEVICE FOR MIXING FLUIDS IN A DOWNFLOW REACTOR

FIELD OF THE INVENTION

The present invention relates to a compact device for mixing fluids in a downflow reactor and to the use thereof for carrying out exothermic reactions. The invention also relates to a reactor comprising a compact mixing device. The invention applies to the sphere of exothermic reactions and more particularly to hydrotreatment, hydrodesulfurization, hydrodenitrogenation, hydrocracking, hydrogenation and hydrodearomatization reactions.

BACKGROUND OF THE INVENTION

Exothermic reactions carried out in refining and/or petrochemistry require cooling by an additional fluid to prevent thermal runaway of the reactor in which they are conducted. It is also necessary to keep a homogeneous temperature gradient within the reactor in order to prevent the existence of hot spots in the catalyst bed. These hot spots can prematurely decrease the catalyst activity. They also lead to non-selective reactions. It is therefore important to have at least one mixing chamber in a reactor that allows homogeneous temperature distribution of the fluids and cooling of the reaction fluids to a desired temperature.

In order to achieve this homogenization, the person skilled in the art is often led to use a specific layout of often complex internals comprising delivery of the quench fluid as homogeneous as possible in the reactor section. This injection is performed downstream from the mixing chamber, either through multi-hole systems such as those described for example in patent documents EP-B-0,716,881, U.S. Pat. No. 5,025,831, or through spider type systems such as those described for example in U.S. Pat. No. 4,836,989. These boxes are generally very complex. They are often double, or even triple, such as those described in U.S. Pat. No. 5,232,283, often provided with internals such as blades, fins, baffles or deflectors, as described for example in U.S. Pat. No. 5,567,396. The main drawbacks of this type of system are the complexity of development and implementation, the induced pressure drop and more particularly the overall dimensions (room taken up in the reactor).

A quench device allowing to provide efficient exchange between the quench fluids) and the fluid(s) of the process is also known from patent application FR-A-2,824,495. This device is integrated in an enclosure and it comprises a quench fluid injection rod, a fluid gathering baffle, the quench box proper, achieving mixing between the quench fluid and the downflow, and a distribution system consisting of a perforated tray and a distribution plate. The quench box comprises a deflector providing swirling of the fluids in a direction substantially non radial and non parallel to the axis of said enclosure and, downstream from the deflector, in the direction of circulation of the reaction fluid, at least one outlet passage section for the mixture of fluids formed in the box. This device allows to overcome some drawbacks of the various systems of the prior art, but it remains very bulky.

Some current devices allow overall dimensions to be reduced. For example, U.S. Pat. No. 6,881,387, EP-B-1,721,660 and U.S. Pat. No. 6,180,068 describe flatter mixing boxes than in the prior art. However, these quench boxes still include many internals likely to produce high pressure drops in order to be efficient.

The object of the present invention thus is to overcome one or more of the drawbacks of the prior art by providing a compact mixing device. The device according to the invention allows a substantial gain in terms of reactor dimensions and provides good mixing of the fluids, as well as good temperature homogeneity.

SUMMARY OF THE INVENTION

A first object of the invention is to provide a compact device for mixing fluids in a downflow reactor.

Another object of the invention concerns the use of a compact device for mixing fluids in a downflow reactor in order to carry out exothermic reactions.

Another object of the invention relates to a reactor comprising a compact fluid mixing device.

Another object of the invention concerns the use of a reactor comprising a compact fluid mixing device for carrying out exothermic reactions.

According to a first aspect, the invention relates to a compact device for mixing fluids in a downflow reactor comprising:

at least one substantially horizontal gathering means provided with a vertical gathering line intended to receive the fluids, at least one injection means arranged in said gathering line, an annular mixing chamber located downstream from the gathering means in the direction of flow of the fluids, said chamber comprising an inlet end directly connected to said gathering line and an outlet end for passage of the fluids, said outlet end being positioned in the radial direction of the reactor enclosure, and a horizontal predistribution plate comprising at least one chimney, said plate being located downstream from said chamber at a distance d2, in the direction of circulation of the fluids.

According to a variant of the invention, the injection means is located at the level of the inlet end of the annular mixing chamber.

According to another variant of the invention, distance d2 between the predistribution plate and the annular mixing chamber ranges between 0 and 100 mm. Preferably, this distance ranges between 0.25 and 100 mm. More preferably, this distance ranges between 0.5 and 5 mm.

According to another variant of the invention, distance d2 between the predistribution plate and the annular mixing chamber is 0 mm, the annular mixing chamber being in contact with the predistribution plate.

According to another variant of the invention, the annular mixing chamber is positioned on the periphery of the reactor enclosure.

According to another variant of the invention, the annular mixing chamber is positioned at a distance d1 from the reactor enclosure, distance d1 ranging between 0.5% and 25% of the diameter of the reactor.

According to another variant of the invention, diameter d of the annular mixing chamber ranges between 0.05 and 0.5 m. Preferably, the diameter ranges between 0.1 and 0.3 m. More preferably, it ranges between 0.15 and 0.25 m.

According to another variant of the invention, the length of the annular mixing chamber ranges between 90 and 270 degrees. Preferably, it ranges between 100 and 250 degrees. More preferably, it ranges between 130 and 200 degrees.

According to a second aspect, the invention relates to the use of the compact mixing device for carrying out exothermic reactions.

According to a third aspect, the invention concerns a reactor of elongate shape along a substantially vertical axis wherein at least one reaction fluid is circulated from the top to the bottom of said reactor through at least one catalyst bed, said reactor comprising downstream from the catalyst bed, in the direction of circulation of said reaction fluid, at least one compact mixing device.

According to a variant of the invention, the reactor also comprises a substantially horizontal distribution plate positioned downstream from the compact mixing device in the direction of circulation of the fluids.

According to another variant of the invention, the reactor also comprises a second catalyst bed arranged downstream from the compact mixing device and the distribution plate.

According to a fourth aspect of the invention, the invention concerns the use, for carrying exothermic reactions, of a reactor of elongate shape along a substantially vertical axis wherein at least one reaction fluid is circulated from the top to the bottom of said reactor through at least one catalyst bed, said reactor comprising downstream from the catalyst bed, in the direction of circulation of said reaction fluid, at least one compact mixing device.

DETAILED DESCRIPTION OF THE INVENTION

Figure 1:
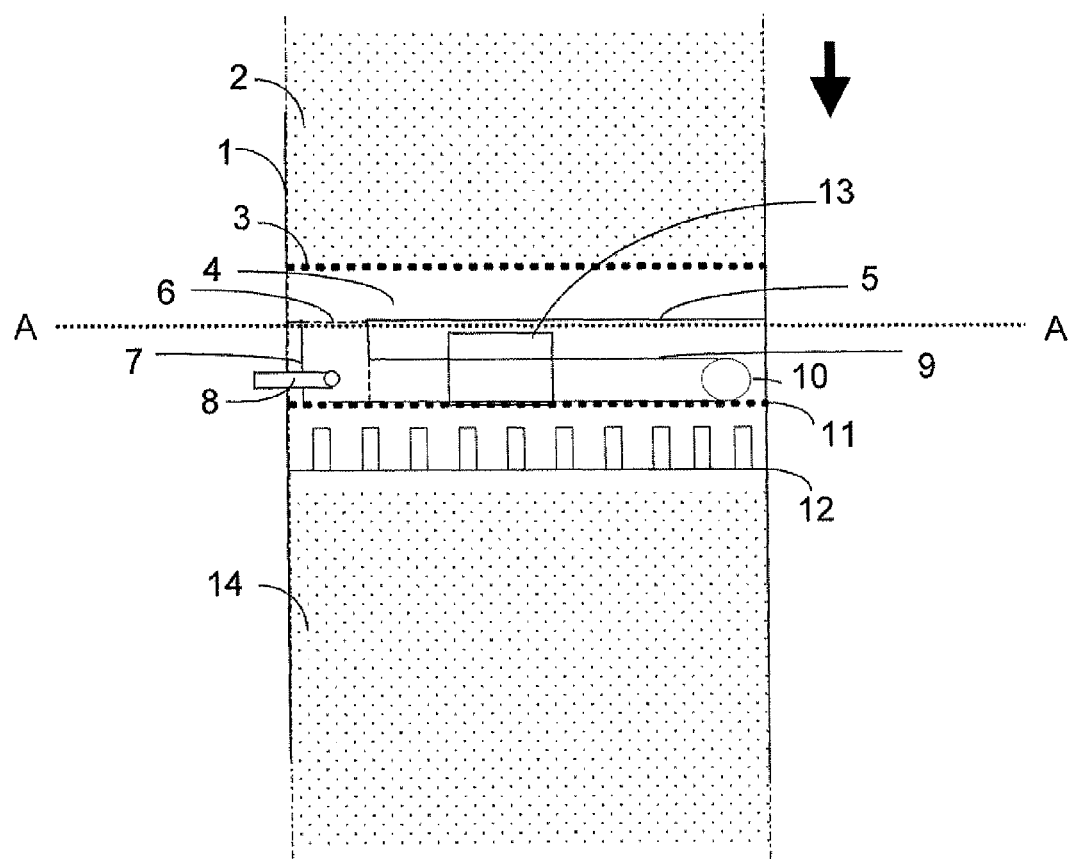
FIG. 1 shows an axial section of a downflow multi-bed reactor comprising the compact mixing device according to the invention. The thick arrow represents the direction of flow of the fluids in the reactor.

The compact mixing device according to the invention is used in a reactor wherein exothermic reactions such as hydrotreatment, hydrodesulfurization, hydrodenitrogenation, hydrocracking, hydrogenation and hydrodearomatization reactions are carried out. The reactor has an elongate shape along a substantially vertical axis. At least one reaction fluid (or process fluid) is circulated from the top to the bottom of said reactor through at least one catalyst bed. At the bed outlet, the reaction fluid is collected, then mixed with a quench fluid in the compact device according to the invention prior to being distributed to the catalyst bed located downstream from the distribution plate. Downstream and upstream are defined with respect to the direction of flow of the reaction fluid.

The reaction fluid can be a gas or a liquid or a mix containing a liquid or a gas, depending on the type of reaction conducted in the reactor. The reaction fluid flowing through the upstream catalyst bed is collected by a substantially horizontal gathering means (5) provided with a substantially vertical gathering line (7) (see FIG. 1). What is referred to as <<substantially vertical>> and <<substantially horizontal>> means, in the sense of the present invention, a variation of a plane with the vertical, respectively the horizon, by an angle α of ±5 degrees. The gathering means consists of a solid plate arranged in the plane perpendicular to the longitudinal axis of the enclosure below the grid of the catalytic bed. This plate extends radially over the total surface of the reactor. It comprises at its end an opening (6) to which said vertical gathering line (7) is connected. The gathering means is used to collect the reaction fluid stream coming from the upstream catalytic bed and it sends this fluid to said gathering line. The gathering means is distant from the catalytic bed grid by a height (H1) creating a gathering space (4). This space is necessary to allow drainage of the reaction fluid to said line. This height H1 must be selected so as to limit the pressure drop upon collection of the fluid flowing from catalyst bed (2) and to limit the clearance height. The clearance height must not modify the drainage of the reaction fluid to the gathering line, or its flow through this line. In an embodiment of the invention, height H1 ranges between 30 and 200 mm, preferably between 30 and 150 mm, and more preferably between 40 and 100 mm. According to an embodiment of the invention, height H1 is 100 mm.

Vertical gathering line (7) opens into annular mixing chamber (9) at the level of the inlet end of said chamber. This line sends the stream of reaction fluid and of quench fluid to said chamber. The diameter of vertical line (7) is selected so as to limit pressure drops. It is thus selected so as to limit the velocity of flow, in said gathering line, of the reaction fluid(s) coming from the catalyst bed located upstream from the gathering means. Preferably, the velocity of said fluids ranges between 2 and 5 m·s$^{-1}$.

The quench fluid is injected through an injection means (8) into the vertical gathering line. Injection is perpendicular to the direction of flow of the reaction fluid in the gathering line. The injection means used is known to the person skilled in the art. It can be a lateral branch connection, or a nozzle or spider, or a nozzle ramp, etc.

The injection means is located at any height in the gathering line from opening (6). Preferably, the injection means is located at the level of the connection of the gathering line with the inlet end of the annular mixing chamber.

The quench fluid can be liquid or gaseous or mixed, containing a liquid or a gas. For example, the quench fluid can be hydrogen.

Annular mixing chamber (9) allows mixing of the reaction fluid with the quench fluid. Said chamber has an incomplete toroidal shape. It is made up of a curved tube forming an arc. It thus comprises two distinct ends: one end referred to as inlet end and another end referred to as outlet end (10), opposite the inlet end. The inlet end is connected to the gathering line, and the outlet end is open and allows the fluid mixture to flow onto the predistribution plate. Outlet end (10) is positioned in the radial direction of reactor enclosure (1). Thus, the fluids leaving outlet section (10) are thrown out in the tangential direction of the section of reactor (1). This layout allows to keep a swirling flow of the fluid mixture on predistribution plate (11). By means of this swirling flow, the reaction fluid(s) and the quench fluid can continue to mix on the predistribution plate. The diameter and the length of annular mixing chamber (9) are selected so as to guarantee good mixing between the stream from bed (2) and the quench fluid, while limiting the pressure drop in the gathering line and the space required in the reactor. The length of the annular mixing chamber is defined by the angle formed by the planes passing through the two ends of said chamber. The length of said chamber ranges between 90 and 270 degrees. Preferably, the length of said chamber ranges between 100 and 200 degrees, 100 and 250 degrees, more preferably yet between 100 and 180 degrees, 130 and 200 degrees. According to a preferred embodiment, said chamber according to the invention has the shape of an open toroid and the section of said chamber is a circle. In another embodiment of the invention, the section of said chamber can be oval or rectangular. Whatever the shape of the section of the annular mixing chamber, the diameter (or the height) d of said chamber is selected so as to limit to the maximum the pressure drop and to limit the space requirement in the reactor. This diameter d ranges between 0.05 and 0.5 m, preferably between 0.1 and 0.3 m, more preferably between 0.15 and 0.4 m, more preferably yet between 0.15 and 0.25 m, and most preferably between 0.1 and 0.35 m. The pressure drop of the mixing device according to the invention only depends on height d of the annular mixing chamber. This pressure drop follows a conventional pressure drop law and it can be defined by the equation as follows:

$$\Delta P = \frac{1}{2} \rho_m V_m^2 \chi \qquad (1)$$

where $\Delta P$ is the pressure drop, $\rho_m$ the average density of the gas+liquid mixture in the annular mixing chamber, $V_m$ the average velocity of the gas+liquid mixture and $\chi$ the pressure drop coefficient associated with the mixing device. This coefficient has been measured at a value 2 whatever the conditions of flow. According to a preferred embodiment of the invention, the diameter is as small as possible in order to limit the space taken up by the annular mixing chamber on the predistribution plate and to have the highest possible mixing efficiency at the outlet of said chamber. The smallest possible diameter d allowing to meet a possible maximum pressure drop criterion is therefore preferably used. The preferred pressure drop range when dimensioning industrial devices is 0.05 bars<$\Delta P_{max}$<0.5 bars (1 bar=$10^5$ Pa).

The fluids have a swirling motion in annular mixing chamber (9). This motion favours mixing and temperature homogeneity of the reaction fluids and of the quench fluid.

The annular mixing chamber is positioned on the periphery of the reactor enclosure and upstream from the predistribution plate in the direction of flow of the fluids. This position of said chamber allows to maximize the length thereof and to save space in the reactor. The annular mixing chamber having a curved shape, it runs along the reactor enclosure at a distance d1. For the compact mixing device according to the invention to take up as lithe space as possible in the reactor, distance d1 ranges between 0.5% and 25% of the reactor diameter, preferably between 0.5% and 10% of the reactor diameter, and more preferably between 1% and 5% of the reactor diameter.

In a preferred embodiment, said chamber is in direct contact with said plate. In this configuration, the annular mixing chamber is thus set directly on the predistribution plate. In another embodiment, said chamber is at a distance d2 from the predistribution plate. In this case, said chamber is fastened to the plate by fastening means known to the person skilled in the art, such as hollow feet. These feet are positioned in the direction of flow of the mixture. Distance d2 ranges between 0 and 100 mm, preferably between 0.25 and 100 mm, more preferably between 0 and 50 mm, more preferably yet between 0.5 and 30 mm, and most preferably between 0.5 and 5 mm.

Positioning the annular mixing chamber on the periphery of the reactor and upstream from the predistribution plate allows to obtain a tangential flow of the fluid mixture above or on the predistribution plate, depending on the embodiment of the invention. This tangential flow above said plate allows to optimize the mixing efficiency. In fact, mixing between the reaction fluid and the quench fluid continues at the level of the predistribution plate, unlike the mixing devices described in the prior art wherein mixing occurs only in the quench chamber. The efficiency of the compact mixing device according to the invention is thus increased. A temperature and concentration homogeneous mixture of the two fluids is obtained on predistribution plate (11).

Predistribution plate (11) located below annular mixing chamber (9) consists of a perforated plate and of one or more chimneys (13). Chimneys (13) are preferably arranged at the centre of the predistribution plate so as not to hinder the swirling flow of the fluid mixture on said plate. The design of this plate is optimized so as to decrease the pressure drop and to produce a liquid clearance of some centimeters. By way of non limitative example, the predistribution plate is perforated with 10-mm holes with a triangular pitch. The predistribution plate extends radially over the entire surface of the reactor and it is arranged in the perpendicular plane to the longitudinal axis of the enclosure. It allows a first separation of the mixture, the liquid flowing through said holes and the gas through said chimneys.

According to an embodiment of the invention, the device according to the invention also comprises a distribution plate allowing to optimize the distribution of the cooled reaction fluid on the downstream catalytic bed. These distribution plates are well known to the person skilled in the art. A complete description of said distribution plate can be found in patent application WO-A-2003/039,733.

In relation to the devices described in the prior art, the compact device according to the present invention affords the following advantages:

increased mixing efficiency due to the swirling flow in the annular mixing chamber and on or at the level of the predistribution plate, ease of implementation, increased compactness due to the location of the annular mixing chamber very close to the predistribution plate and to the injection of the quench fluid at the level of said chamber, low induced pressure drop due to the absence of internals in the annular mixing chamber.

DETAILED DESCRIPTION OF THE FIGURES

FIG. 1 illustrates the quench device according to the invention arranged in a reactor housed in enclosure (1) of elongate shape along a substantially vertical axis wherein at least one reaction fluid is circulated from the top to the bottom through at least one catalyst bed (2). The mixing device according to the invention is arranged below catalyst bed (2) with respect to the flow of the reaction fluid in the reactor enclosure (1). Support grid (3) is used to carry catalyst bed (2) so as to provide an empty space (4) below the latter. This empty space or gathering space (4) allows to collect the stream coming from catalyst bed (2) at the level of the gathering means. The reaction fluid collected consists for example of a gas phase and a liquid phase. Gathering means (5), also referred to as baffle, is a solid plate open only at one point (6) for draining the fluid stream to annular mixing chamber (9). The reaction fluid from bed (2) is thus compelled, in empty space (4), to pass through vertical gathering line (7). The quench fluid is injected into gathering line (7) via an injection line (8). In this example, annular mixing chamber (9) has a toroid shape. Said chamber (9) is connected at the inlet end thereof to gathering line (7). The quench fluid and the reaction fluid stream from upper bed (2) are thus compelled to enter said chamber (9) where they mix and have a swirling flow. At the outlet of said chamber, the fluid mixture flows on predistribution plate (11). The annular mixing chamber is set on the predistribution plate and on the periphery of the reactor. This position allows to save space in the reactor. Mixing continues thanks to a swirling flow of the fluids on the grid of the distribution plate. The gas and liquid phases of the mixture divide on perforated plate (11) provided with one or more central chimneys (13) allowing passage of the gas. The liquid flows through the perforations of the plate and forms a showerhead or rain type flow. The number and the size of the perforations of perforated plate (11) are so selected that a certain height of liquid is always present on the plate. The number and the size of central chimneys (13) are selected so as to optimize separation of the gas and liquid phases on plate (12), while keeping a sufficient distance between the top of chimneys (13) and gathering baffle (5) so as not to generate a high pressure drop at this point of the device. The purpose of perforated plate (11) is to deliver the stream leaving mixing chamber (9) and supplying distribution plate (12) in a relatively balanced manner. The purpose of distribution plate (12) is to redistribute the gas and liquid phases at the inlet of catalyst bed (14) downstream from this distribution plate.

Figure 2:
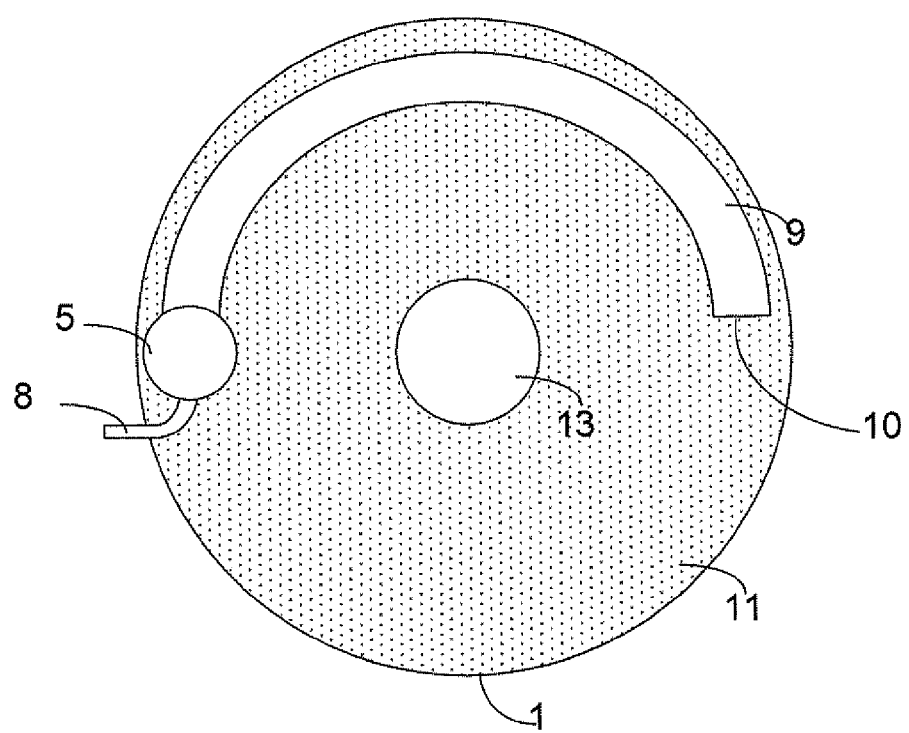
FIG. 2 shows a top view of the compact mixing device according to the section shown by dotted line A-A.

Mixing chamber (9) according to the invention, illustrated in FIG. 2, is of annular shape, and more precisely it has the shape of a toroid. It consists of a curved tube forming an arc that is not closed. Said chamber is open at its end opposite the vertical gathering line, and opening section (10) of annular mixing chamber (9) is substantially positioned in the radial direction of enclosure (1). Thus, the flow of fluids leaving opening section (10) is thrown out in the tangential direction of the section of enclosure (1). This layout allows to keep a swirling flow of the mixture on predistribution plate (11). The diameter and the length of annular mixing chamber (9) are selected so as to guarantee good mixing between the stream from bed (2) and the quench fluid, while limiting the pressure drop in the gathering line and the space required in the reactor.

In the examples below, the terms <<toroid>>, <<mixing chamber>> or <<annular mixing chamber>> are used indiscriminately to designate the annular mixing chamber according to the invention.

Example 1

Analysis of the Fluid Flow at the Level of the Annular Chamber According to the Invention The flow of two fluids in the annular mixing chamber according to the invention is simulated using a fluid mechanics software (Fluent 6.3, developed by ANSYS Inc., Canonsburg, USA). The numerical simulations concerned the analysis of the mixing phenomena:

(a) in the annular mixing chamber,
(b) at the outlet of said chamber.

The characteristics of the various annular mixing chambers tested and the experimental simulation conditions are given in Table 1 hereafter.

These simulations are carried out considering the most unfavourable conditions, i.e. the case where the fluids (liquid water and gaseous nitrogen) are not mixed at all at the toroid inlet. The following configuration is thus imposed on the software: the fluids are delivered at two clearly distinct temperatures T1 and T2 at the toroid inlet, so that half of the toroid inlet section is at temperature T1 and the other half at temperature T2.

The characteristics of the annular mixing chambers tested are summed up in Table 1.

TABLE 1

| | Toroid diameter (m) | Toroid length (m) | Liquid phase flow rate ($m^3 \cdot h^{-1}$) | Gas phase flow rate ($m^3 \cdot h^{-1}$) | Temperature T1 (K) | Temperature T2 (K) |
|---|---|---|---|---|---|---|
| Toroid No. 1 | 0.1 | 1 | 22.62 | 5.65 | 273 | 323 |
| Toroid No. 2 | 0.1 | 1 | 11.88 | 59.38 | 273 | 323 |
| Toroid No. 3 | 0.1 | 1 | 5.94 | 25.45 | 273 | 323 |
| Toroid No. 4 | 0.3 | 3 | 53.44 | 229.02 | 273 | 323 |

The temperature distribution calculated at the toroid outlet by the simulation software is used to estimate the mixing efficiency of the toroid. This efficiency is defined by the relation as follows:

$$\eta = 1 - \frac{2\sigma(T)}{\Delta T_{MAX}} \quad (2)$$

where $\eta$ is the mixing efficiency, $\sigma$ is the standard deviation of the temperatures and $\Delta T_{max}$ the maximum difference between the temperatures, i.e. the absolute value of (T2−T1). The multiple simulations have highlighted that the theoretical mix in the toroid globally follows a law of the type as follows:

$$\eta = 1 - \exp^{\left(-\frac{x}{1.5Ud}\right)} \quad (3)$$

where x is the linear distance traveled in the toroid, U is the velocity of the liquid in the toroid and d is the diameter of the toroid.

The results obtained from the various simulations are given in Table 2 below. The mixing efficiencies are calculated at mid-length of the mixing chamber (L/2) and at the mixing chamber outlet.

TABLE 2

| Mixing efficiency | Toroid No. 1 | Toroid No. 2 | Toroid No. 3 | Toroid No. 4 |
|---|---|---|---|---|
| Mixing chamber mid-length | 99% | 85% | 80% | 92% |
| Mixing chamber outlet | 99.9% | 92% | 90% | 99% |

The mixing efficiency (according to Equation 1) generated at mid-length of the annular mixing chamber or at the outlet of said chamber is above 80%. In some chamber configurations, this efficiency is even 99%. This means that very good mixing of the fluids in the chamber according to our invention and excellent fluid temperature homogenization are obtained.

Example 2

Analysis of the Fluid Flow at the Level of the Predistribution Plate According to the Invention We want to determine the mixing efficiency generated in the mixing device according to the invention at the level of the predistribution plate. The fluid flow on the predistribution plate is therefore simulated with the fluid mechanics software (Fluent 6.3, developed by ANSYS Inc., Canonsburg, USA). The characteristics of the various mixing devices and the experimental conditions tested are summed up in Table 3. The simulations are performed with single-phase flows, i.e. in the absence of a gas phase. They are thus representative of the case where the quench fluid is liquid and only the liquid phases are to be mixed.

described in the prior art. The mixing device according to the invention has a high fluid mixing efficiency thanks to the combination of the annular mixing chamber set on the predistribution plate and of the predistribution plate. This layout allows to achieve continuity of the swirling fluid flow on the predistribution plate. Mixing of the fluids therefore continues on said plate.

TABLE 3

| | Toroid diameter (m) | Toroid length (° degrees) | Reactor diameter (m) | Liquid phase velocity (m/s) | Temperature T1 | Temperature T2 | Height of liquid on the pre-distribution plate in m |
|---|---|---|---|---|---|---|---|
| Toroid No. 1 | 0.1 | 90° | 0.48 | 0.5 | 273 | 323 | 0.12 |
| Toroid No. 2 | 0.1 | 90° | 0.48 | 1 | 273 | 323 | 0.12 |
| Toroid No. 3 | 0.1 | 90° | 0.48 | 0.2 | 273 | 323 | 0.12 |
| Toroid No. 4 | 0.1 | 90° | 0.48 | 2 | 273 | 323 | 0.12 |
| Toroid No. 5 | 0.1 | 90° | 0.48 | 0.5 | 273 | 323 | 0.05 |
| Toroid No. 6 | 0.1 | 90° | 0.48 | 1 | 273 | 323 | 0.05 |
| Toroid No. 7 | 0.3 | 90° | 2.5 | 1 | 273 | 323 | 0.15 | in order to study the mixing efficiency at the level of the predistribution plate in the device according to the invention, the section of the toroid is divided into two zones of equal surface area: one being at a temperature T1 and the other at a temperature T2. This experimental condition corresponds to the most unfavourable case, i.e. when no mixing has occurred between the two fluids in the annular mixing chamber. Only the efficiency of the swirling flow on the predistribution plate is measured under such conditions.

The results obtained are given in Table 4.

TABLE 4

| Mixing efficiency | Toroid No. 1 | Toroid No. 2 | Toroid No. 3 | Toroid No. 4 | Toroid No. 5 | Toroid No. 6 | Toroid No. 7 |
|---|---|---|---|---|---|---|---|
| on the predistribution plate | 91% | 90% | 96% | 88% | 82% | 85% | 87% |

The mixing efficiency (according to Equation 1) generated at the toroid outlet on the predistribution plate is always greater than or equal to 80%. This means that the swirling flow generated takes significantly part in mixing of the fluids in the operating range studied by simulation.

Conclusion of Examples 1 and 2

Considering that the mixing efficiencies in the toroid and at the toroid outlet on the predistribution plate can be combined, the total mixing efficiency of the device according to the invention is expressed by the formula as follows:

$$\eta_{total} = 1 - (1-\eta_{swirl})*(1-\eta_{toroid}) \quad (4)$$

Figure 3:
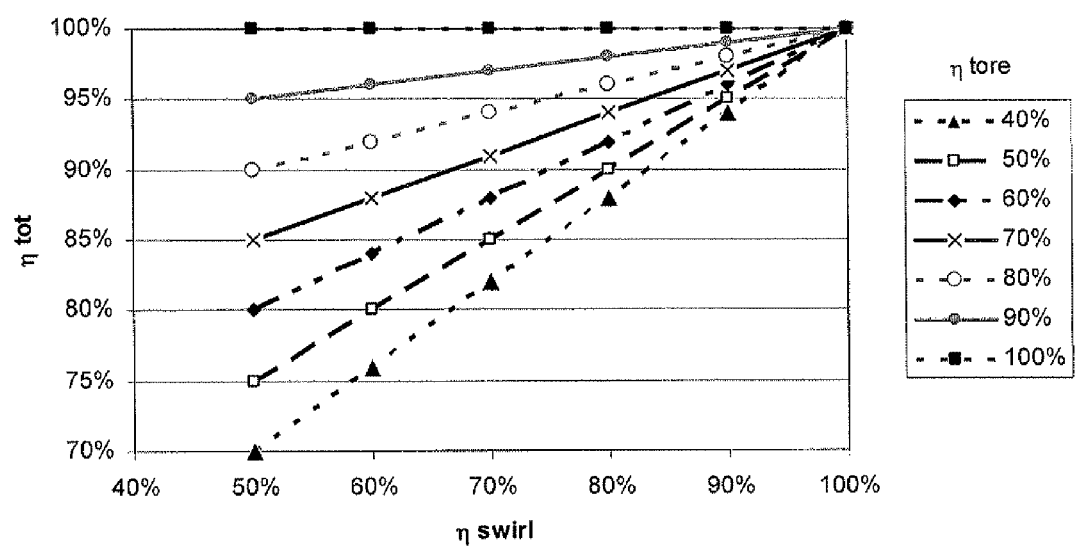
FIG. 3 shows the total mixing efficiency of the device according to the invention as a function of the mixing efficiency measured on the predistribution plate (abscissa $\eta_{swirl}$) and for different efficiencies of the annular mixing chamber ($\eta_{tore}$).

FIG. 3 illustrates the cumulative mixing efficiencies. If the mixing efficiency in the toroid ($\eta_{toroid}$) is 50% and the mixing efficiency at the toroid outlet ($\eta_{swirl}$) on the predistribution plate is 80%, an overall mixing efficiency above 90% is obtained. Thus, according to the device of the invention, it is not necessary to have an optimized fluid mixing efficiency in the annular mixing chamber, unlike the mixing devices Example 3

Cold Model Tests

By way of non limitative example, mixing efficiency measurements were carried out with a mixing device according to the invention arranged in a reactor. The experimental conditions are as follows:

A 480 mm-diameter reactor is divided into two identical sectors in the upper part thereof. The two sectors are identically supplied with gas (air) and liquid (water). The height of the sectors is 500 mm. The sectors are supplied with fluids at different temperatures T1 (283 K) and T2 (330 K). The gathering baffle is arranged below the granular bed, carried by the support grid. The distance between the support grid and the gathering baffle is 100 mm. The vertical gathering line is 150 mm in height and 100 mm in diameter. The structural characteristics of the various mixing toroids tested are given in Table 5. The quench fluid (water) injection tube is 20 mm in diameter. The predistribution plate is provided with a 4 cm-diameter and 25 cm-high central chimney. The predistribution plate is perforated with 1 cm-diameter holes with a triangular pitch of 6.4 cm. A distribution plate of perforated chimney plate tray type is positioned below the predistribution plate. A bed of inert balls representing a catalytic bed is positioned downstream from the distribution plate in the direction of flow of the fluids. 6 thermocouples distributed over the column section are positioned 3 cm below the first inert ball layers. The mixing efficiency of the mixing device according to the invention is calculated from the temperature records provided by the thermocouples, according to Equation (2). The standard deviation of the temperatures recorded is therefore first calculated.

The tests are carried out for the following flow rate conditions:
- Flow rate of liquid leaving the upper bed: 15 m³·h⁻¹;
- Flow rate of gas leaving the upper bed: 65 m³·h⁻¹; and
- Quench liquid flow rate: 5 m³·h⁻¹.

The results obtained are given in Table 5.

TABLE 5

|        | Toroid diameter in mm | Toroid length (° degree) | Overall measured thermal efficiency | Theoretical mixing efficiency in the toroid | Total theoretical efficiency estimated by Equation (4) |
|--------|------|------|--------|-----|-----|
| Test 1 | 50   | 180° | 99.8%  | 50% | 90% |
| Test 2 | 100  | 180° | 99.95% | 74% | 95% |
| Test 3 | 50   | 270° | 99.7%  | 63% | 93% |
| Test 4 | 100  | 90°  | 99.85% | 50% | 90% |

The theoretical efficiency is calculated using a 80% mixing efficiency on the predistribution plate.

Among all the configurations tested, the overall measured thermal efficiency is, in all the cases, above 99.7%, the 100% difference being due to the measuring noise (not significant). These results show that, even for quench toroids whose theoretical mixing efficiency was calculated at 50% according to Equation (2), the swirling mixture at the toroid outlet on the predistribution plate allows to reach performances close to 100% mixing. Thus, in order to achieve industrial-scale dimensioning of the quench devices, a 50% theoretical mixing efficiency relative to the quench toroid is targeted, which will allow to reach an overall efficiency close to 100%.

Example 4

An example of mixing device dimensioning is described. It is based on a reaction enclosure diameter of 2.5 m. The density of the liquid phase is 800 kg·m⁻³ and the density of the gas is 10 kg·m⁻³. The flow rates of the liquid and of the gas leaving the first catalytic bed are 0.11 and 0.49 m³·s⁻¹ respectively. The flow rate of the quench liquid injected into the vertical gathering line via an injection means is 0.03 m³·s⁻¹. The height of the gathering space (H1) is 0.1 m so as to generate a negligible pressure drop in this zone. The diameter of the vertical gathering line is 0.4 m. The diameter of the quench fluid injection means is 0.12 m. The diameter of the annular mixing chamber is 0.3 m, for a linear length of 3.1 m. The space between the reactor enclosure and the annular mixing chamber is 0.03 m. Four central chimneys are arranged in a square in the middle of the perforated plate of the predistribution plate. These chimneys are 0.3 m in diameter and 0.25 m in height. The predistribution plate is perforated with 1 cm-diameter holes with a 6.4-cm triangular perforation pitch. A distribution plate provided with chimneys is positioned below the perforated plate. The distance between the perforated predistribution plate and the distribution plate is 0.25 m.

Performance Estimation:

The pressure drop of the quench device is estimated according to Equation (3) at 16000 Pa. The liquid clearance height on the perforated plate is 15 cm, in accordance with the observations made on the cold model. The device according to the invention allows to provide good mixing at the quench toroid outlet. The theoretical efficiency of the quench toroid is 54% according to Equation (2). From the calculations and measurements conducted on the cold model, this is sufficient to provide a total efficiency of the device close to 100%.

Device Overall Dimensions:

The dimension of the device according to the invention, delimited by the support grid of the catalyst bed (element 3 in FIG. 1) and by the predistribution plate (element 11 in FIG. 1), is about 0.5 m. It is approximately 0.75 m if we add the dimension of the distribution plate (element 12) located below the predistribution plate.

The mixing device described in patent application FR-A-2,824,495 also uses a catalyst bed support grid and a predistribution plate located just above a distribution plate. The dimension of this device, calculated between the catalyst bed support grid and the predistribution plate, is about 0.88 m.

By way of comparison, the mixing device according to the invention allows a 76% space saving in relation to the device described in application FR-A-2,824,495. The 0.38 m thus saved in relation to the device of the prior art can be used in the catalyst beds. Thus, the compact mixing device according to the invention also allows to improve the performances of a reactor by increasing the amount of catalyst in the catalyst beds.

The invention claimed is:

1. A compact device for mixing fluids in a downflow reactor comprising:
    a reactor enclosure (1),
    at least one substantially horizontal gathering means (5) provided with a vertical gathering line (7) intended to receive the fluids,
    at least one injection conduit (8) arranged in said gathering line,
    an annular mixing chamber (9) located downstream from said at least one substantially horizontal gathering means (5) in the direction of circulation of the fluids, said annular mixing chamber comprising an inlet end directly connected to said gathering line (7) and an outlet end (10) for passage of the fluids, said outlet end (10) being positioned in the radial direction of said reactor enclosure (1), and
    a horizontal predistribution plate (11) having a plurality of holes and comprising at least one chimney (13), said plate being located downstream from said chamber (9) at a distance d2, in the direction of circulation of the fluids, and wherein said annular mixing chamber is in the form of an open toroid and has a length as defined by the angle formed by radial planes passing through the inlet and outlet ends of the annular mixing chamber, said angle ranging between 90 and 270 degrees.

2. A device as claimed in claim 1, characterized in that the injection conduit is located at the level of the inlet end of the annular mixing chamber (9).

3. A device as claimed in claim 1, characterized in that distance d2 ranges between 0 and 100 mm.

4. A device as claimed in claim 1, characterized in that distance d2 is 0 mm, the annular mixing chamber (9) being in contact with the horizontal predistribution plate (11).

5. A device as claimed in claim 1, characterized in that distance d2 ranges between 0.25 and 100 mm.

6. A device as claimed in claim 1, characterized in that annular mixing chamber (9) is positioned at a distance d1 within the periphery of the reactor enclosure (1) the distance d1 ranging from 0.5% to 25% of the diameter of the reactor.

7. A device as claimed in claim 1, characterized in that diameter d of said annular mixing chamber ranges between 0.05 and 0.5 m.

8. A reactor having an enclosure (1) of elongate shape along a substantially vertical axis comprising means for circulating at least one reaction fluid from the top to the bottom of said reactor through at least one catalyst bed (2), said reactor comprising downstream from catalyst bed (2), in the direction of circulation of said reaction fluid, at least one mixing device as claimed in claim 1.

9. A reactor as claimed in claim 8, characterized in that said reactor also comprises a substantially horizontal distribution plate (12) positioned downstream from the mixing device in the direction of circulation of the fluids.

10. A reactor as claimed in claim 9, characterized in that said reactor also comprises a second catalyst bed (14) arranged downstream from the mixing device and the substantially horizontal distribution plate.

11. A device according to claim 1, wherein said angle ranges between 100 and 250 degrees.

12. A device according to claim 1, wherein said angle ranges between 130 and 200 degrees.

13. A device as claimed in claim 6, characterized in that the injection conduit is located at the level of the inlet end of the annular mixing chamber (9).

\* \* \* \* \*